US011564077B2

(12) United States Patent
Barabell et al.

(10) Patent No.: US 11,564,077 B2
(45) Date of Patent: Jan. 24, 2023

(54) MULTI-CARRIER RADIO POINT FOR A CENTRALIZED RADIO ACCESS NETWORK

(71) Applicant: CommScope Technologies LLC, Hickory, NC (US)

(72) Inventors: Arthur J. Barabell, Sudbury, MA (US); Irfaan Ahamed Salahuddeen, Acton, MA (US); Santosh Ajjannavar, Belguam (IN); Shanthakumar Ramakrishnan, Westford, MA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/663,257

(22) Filed: Oct. 24, 2019

(65) Prior Publication Data

US 2020/0137549 A1 Apr. 30, 2020

Related U.S. Application Data

(60) Provisional application No. 62/750,660, filed on Oct. 25, 2018.

(51) Int. Cl.
*H04W 48/16* (2009.01)
*H04W 8/00* (2009.01)
(Continued)

(52) U.S. Cl.
CPC .......... *H04W 8/005* (2013.01); *H04B 7/0413* (2013.01); *H04L 5/14* (2013.01);
(Continued)

(58) Field of Classification Search
CPC ..... H04W 8/005; H04W 48/16; H04W 88/12; H04W 48/17; H04W 88/085;
(Continued)

(56) References Cited

U.S. PATENT DOCUMENTS 6,785,558 B1   8/2004  Stratford et al.
6,801,788 B1  10/2004  Csapo et al.
(Continued)

FOREIGN PATENT DOCUMENTS

JP    2012527796 A   11/2012
WO    2010139112 A1  12/2010
(Continued)

OTHER PUBLICATIONS

Haberland et al., "Base Stations in the Cloud", Alcatel Lucent, Sep. 28, 12, pp. 1-23.
(Continued)

*Primary Examiner* — Jay P Patel
(74) *Attorney, Agent, or Firm* — Fogg & Powers LLC

(57) ABSTRACT

One embodiment is directed to a multi-carrier radio point for use in a centralized radio access network (C-RAN). The multi-carrier radio point is configured so that the processing and hardware resources provided by the radio point can be associated with controllers of the C-RAN in a flexible manner. A single multi-carrier radio point can be used with multiple controllers to serve multiple cells, where the processing and hardware resources used for the multiple controllers need not be configured and used in the same way.

26 Claims, 7 Drawing Sheets

(51) Int. Cl.
*H04W 88/12* (2009.01)
*H04B 7/0413* (2017.01)
*H04L 5/14* (2006.01)
*H04W 48/00* (2009.01)

(52) U.S. Cl.
CPC ........... *H04W 48/16* (2013.01); *H04W 48/17* (2013.01); *H04W 88/12* (2013.01)

(58) Field of Classification Search
CPC ........ H04W 24/02; H04B 7/0413; H04L 5/14; H04L 5/001; H04L 5/0035; H04L 5/0053
See application file for complete search history.

(56) References Cited

U.S. PATENT DOCUMENTS

| | | | |
|---|---|---|---|
| 6,963,552 | B2 | 11/2005 | Sabat, Jr. et al. |
| 7,787,854 | B2 | 8/2010 | Conyers et al. |
| 8,682,338 | B2 | 3/2014 | Lemson et al. |
| 8,762,510 | B2 | 6/2014 | Sabat, Jr. et al. |
| 8,929,288 | B2 | 1/2015 | Stewart et al. |
| 9,380,466 | B2 | 6/2016 | Eyuboglu et al. |
| 9,414,399 | B2 | 8/2016 | Eyuboglu et al. |
| 9,712,343 | B2 | 7/2017 | Dussmann et al. |
| 9,794,791 | B2 | 10/2017 | Hasarchi et al. |
| 9,867,052 | B2 | 1/2018 | Sabat, Jr. et al. |
| 9,883,410 | B2* | 1/2018 | Chen .................. H04W 88/005 |
| 9,917,622 | B2 | 3/2018 | Lange |
| 9,936,470 | B2 | 4/2018 | Eyuboglu et al. |
| 9,998,310 | B2 | 6/2018 | Barbieri et al. |
| 10,015,685 | B2 | 7/2018 | Chen et al. |
| 10,057,916 | B2 | 8/2018 | Barabell et al. |
| 10,097,391 | B2 | 10/2018 | Fertonani et al. |
| 10,231,256 | B2 | 3/2019 | Checko |
| 10,313,917 | B2 | 6/2019 | Halabian et al. |
| 10,355,895 | B2 | 7/2019 | Barbieri et al. |
| 10,499,388 | B2 | 12/2019 | Tarlazzi |
| 10,638,266 | B2 | 4/2020 | Huang et al. |
| 10,805,831 | B1* | 10/2020 | Sung .................. H04W 28/0804 |
| 10,925,116 | B2* | 2/2021 | Zhang .................. H04L 25/0226 |
| 2013/0128810 | A1 | 5/2013 | Lee et al. |
| 2014/0161447 | A1* | 6/2014 | Graves ............... H04Q 11/0062 398/48 |
| 2014/0241224 | A1 | 8/2014 | Fischer et al. |
| 2015/0229372 | A1 | 8/2015 | Perlman et al. |
| 2015/0303950 | A1 | 10/2015 | Shattil |
| 2015/0381217 | A1 | 12/2015 | Kim et al. |
| 2016/0037550 | A1 | 2/2016 | Barabell et al. |
| 2016/0308641 | A1* | 10/2016 | Zeng ................ H04B 10/25753 |
| 2017/0135099 | A1* | 5/2017 | Song .................... H04W 16/02 |
| 2017/0164215 | A1 | 6/2017 | Chen et al. |
| 2017/0250927 | A1 | 8/2017 | Stapleton et al. |
| 2017/0373890 | A1 | 12/2017 | Fertonani et al. |
| 2018/0063847 | A1 | 3/2018 | Huang et al. |
| 2018/0234875 | A1 | 8/2018 | Leroudier |
| 2018/0248797 | A1* | 8/2018 | Kim ........................ H04L 12/42 |
| 2018/0270692 | A1* | 9/2018 | Yoon ...................... H04L 1/0026 |
| 2018/0287696 | A1 | 10/2018 | Barbieri et al. |
| 2018/0368205 | A1* | 12/2018 | Park ...................... H04L 5/0048 |
| 2019/0007246 | A1 | 1/2019 | Fertonani et al. |
| 2019/0053400 | A1* | 2/2019 | Hendrix ............. H05K 7/20136 |
| 2019/0098643 | A1* | 3/2019 | Kronestedt ........... H04L 5/0032 |
| 2019/0104458 | A1* | 4/2019 | Svennebring ......... H04W 40/18 |
| 2019/0116568 | A1 | 4/2019 | Fertonani et al. |
| 2019/0208575 | A1 | 7/2019 | Barbieri et al. |
| 2019/0245740 | A1* | 8/2019 | Kachhla ................ H04L 41/082 |
| 2019/0341970 | A1 | 11/2019 | Lange |
| 2019/0341985 | A1* | 11/2019 | Chopra ................ H04B 7/0639 |
| 2019/0342798 | A1* | 11/2019 | Raghothaman ..... H04W 72/085 |
| 2019/0357196 | A1* | 11/2019 | Majmundar ............ H04L 69/22 |
| 2020/0028561 | A1* | 1/2020 | Leulescu ................ H04B 7/022 |
| 2020/0077304 | A1* | 3/2020 | Sandberg .......... H04W 28/0257 |
| 2020/0077355 | A1* | 3/2020 | Sandberg .............. H04J 3/0641 |
| 2020/0092154 | A1 | 3/2020 | Kwon et al. |
| 2020/0092229 | A1 | 3/2020 | Levi et al. |
| 2020/0204252 | A1* | 6/2020 | Barbieri ................ H04W 36/22 |
| 2021/0014765 | A1* | 1/2021 | Shan ...................... H04W 8/02 |
| 2021/0219197 | A1* | 7/2021 | Prasad .................. H04W 36/08 |

FOREIGN PATENT DOCUMENTS

| | | |
|---|---|---|
| WO | 2014018864 A1 | 1/2014 |
| WO | 2016145371 A2 | 9/2016 |
| WO | 2016201632 A1 | 12/2016 |
| WO | 2017070635 A1 | 4/2017 |
| WO | 2018017468 A1 | 1/2018 |
| WO | 2020047126 A1 | 3/2020 |
| WO | 2020051146 A1 | 3/2020 |
| WO | 2020056183 A1 | 3/2020 |

OTHER PUBLICATIONS

Zhu et al., "Virtual Base Station Pool: Towards A Wireless Network Cloud for Radio Access Networks", CF' 10, May 2010, pp. 1-10, ACM.
International Searching Authority, "International Search Report and Written Opinion from PCT Application No. PCT/US2019/057952", from Foreign Counterpart to U.S. Appl. No. 16/663,257, filed Feb. 27, 2020, pp. 1-11, Published: WO.
International Searching Authority, "International Search Report and Written Opinion from PCT Application No. PCT/US2021/039614", from Foreign Counterpart to U.S. Appl. No. 17/362,344, filed Oct. 13, 2021, pp. 1 through 9, Published: WO.
European Patent Office, Extended European Search Report from U.S. Appl. No. 16/663,257, dated May 9, 2022, From Foreign Counterpart of U.S. Appl. No. 16/663,257, pp. 1 through 29, Published in EP.
U.S. Patent and Trademark Office, "Notice of Allowance", U.S. Appl. No. 17/362,344, filed Sep. 2, 2022, pp. 1 through 39, Published: US.

* cited by examiner

MULTI-CARRIER RADIO POINT FOR A CENTRALIZED RADIO ACCESS NETWORK

CROSS-REFERENCE TO RELATED APPLICATIONS

This application claims the benefit of U.S. Provisional Patent Application Ser. No. 62/750,660, filed on Oct. 25, 2018, which is hereby incorporated herein by reference in its entirety.

BACKGROUND

A centralized radio access network (C-RAN) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs"). Each controller is coupled to the radio points over front-haul communication links or a front-haul network.

Typically, each radio point is associated with a single baseband unit and supports a single carrier provided by a wireless operator. If more than a single carrier's worth of capacity needs to be provided in a given coverage area or if multiple carriers are needed to provide service within a given coverage area, multiple remotes units would typically be deployed within the same coverage area.

SUMMARY

One embodiment is directed to a multi-carrier radio point for a central radio access network (C-RAN) comprising a plurality of controllers and a plurality of radio points. The multi-carrier radio point comprises at least one programmable device configured to provide processing resources for providing wireless service to a plurality of items of user equipment (UEs) using multiple bi-directional radio frequency carriers. The multi-carrier radio point further comprises at least one network interface configured to communicatively couple the multi-carrier radio point to a front-haul network in order to communicate with the plurality of controllers. The multi-carrier radio point further comprises a plurality of radio frequency modules configured to wirelessly communicate using one or more antennas. At least one programmable device is configured to: perform a discovery process in order for the multi-carrier radio point to be associated with one or more of the controllers; receive requests from one or more controllers for the processing resources and the radio frequency modules; assign the processing resources and the radio frequency modules to the one or more controllers based on the requests; and configure the processing resources and the radio frequency modules to instantiate one or more radio points instances. Each radio point instance is homed to a respective one of the controllers, each radio point instance implementing a respective carrier configuration.

Another embodiment is directed to a method for a multi-carrier radio point used with a central radio access network (C-RAN) comprising a plurality of controllers and a plurality of radio points. The multi-carrier radio point comprises at least one programmable device configured to provide processing resources for providing wireless service to a plurality of items of user equipment (UEs) using multiple bi-directional radio frequency carriers and a plurality of radio frequency modules configured to wirelessly communicate using one or more antennas. The method comprises performing a discovery process in order for the radio point to be associated with one or more of the controllers; receiving at the radio point requests from one or more controllers for the processing resources and the radio frequency modules; assigning the processing resources and the radio frequency modules to the one or more controllers based on the requests; and configuring the processing resources and the radio frequency modules to instantiate one or more radio points instances. Each radio point instance is homed to a respective one of the controllers, each radio point instance implementing a respective carrier configuration.

Other embodiments are disclosed.

The details of various embodiments are set forth in the accompanying drawings and the description below. Other features and advantages will become apparent from the description, the drawings, and the claims.

DRAWINGS

Figure 3:
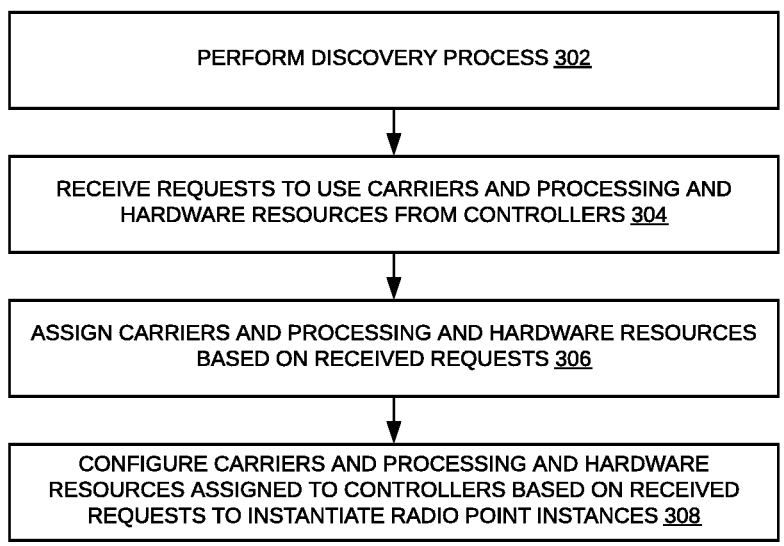

FIG. 3 comprises a high-level flowchart illustrating one exemplary embodiment of a method of configuring a multi-carrier radio point used in a C-RAN.

Figure 2:
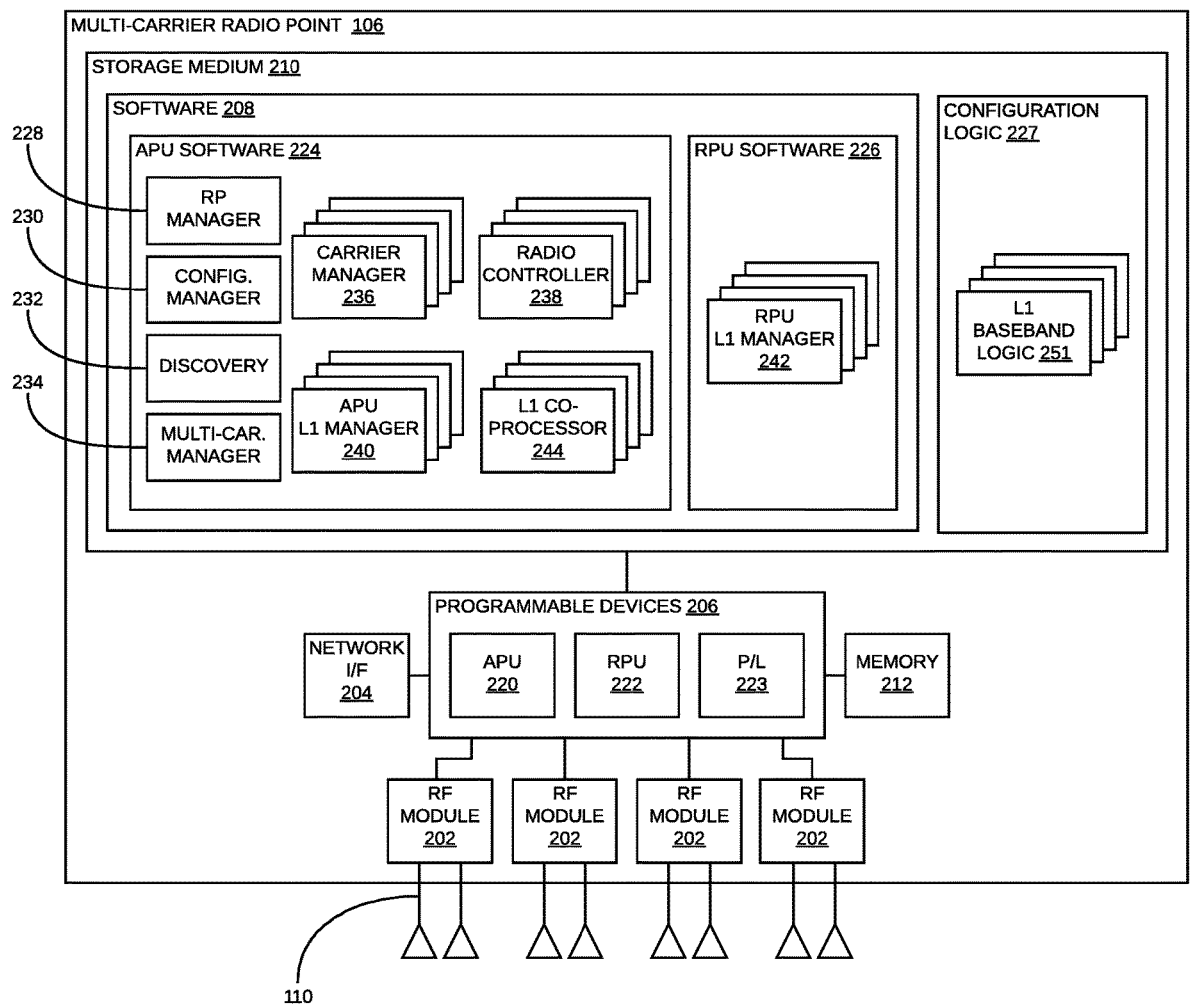
FIG. 2 is a block diagram illustrating one exemplary embodiment of a multi-carrier radio point.

FIGS. 4A-4D are block diagrams illustrating various configurations of the multi-carrier radio point shown in FIG. 2.

Like reference numbers and designations in the various drawings indicate like elements.

DETAILED DESCRIPTION

Figure 1:
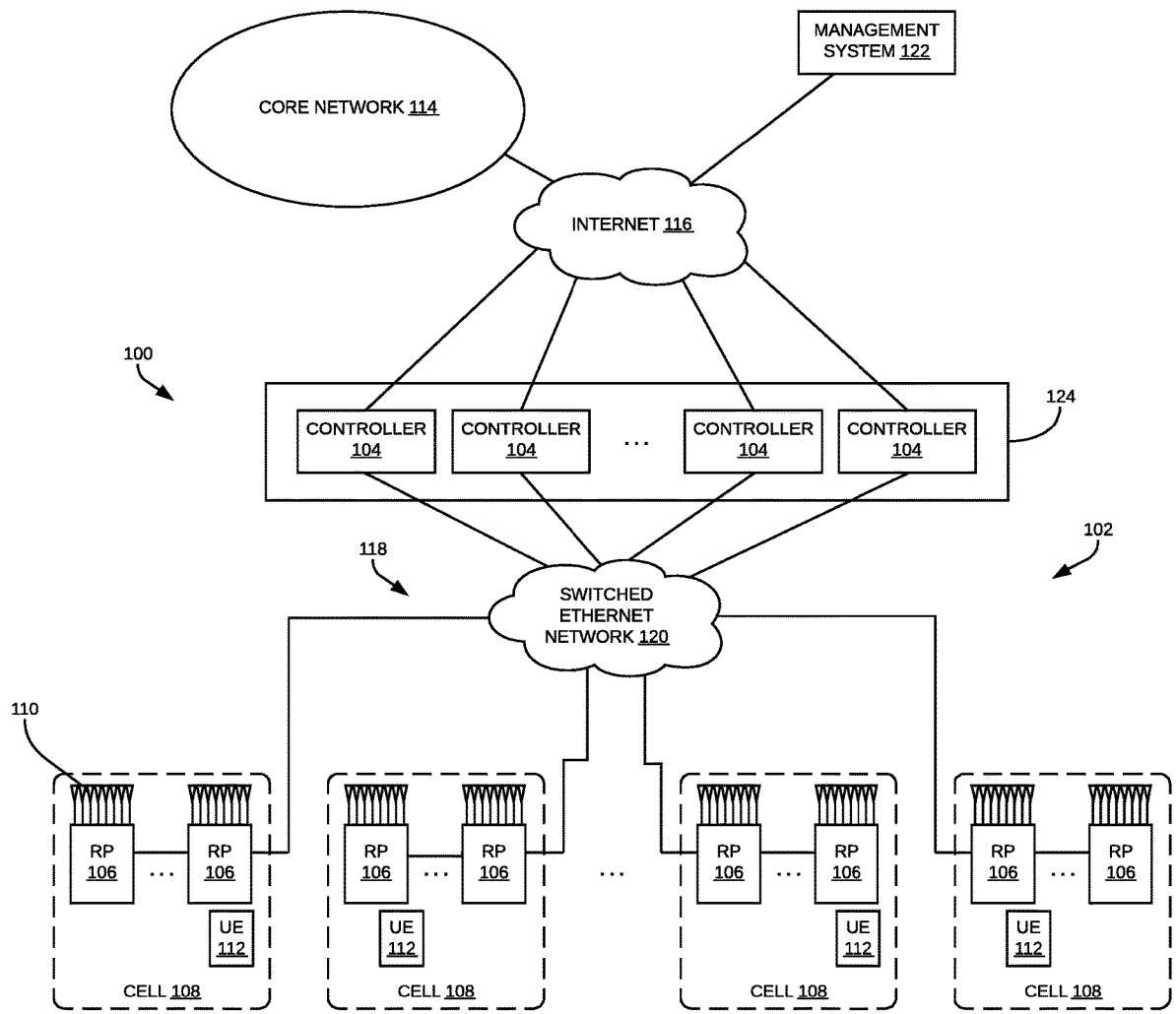
FIG. 1 is a block diagram illustrating one exemplary embodiment of a radio access network (RAN) system in which the multi-carrier radio points described here can be used.

FIG. 1 is a block diagram illustrating one exemplary embodiment of a radio access network (RAN) system 100 in which the multi-carrier radio points described here can be used. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1, the system 100 is implemented at least in part using a C-RAN architecture that employs multiple baseband units 104 and multiple radio points (RPs) 106. The system 100 is also referred to here as a "C-RAN system" 100. Each RP 106 is remotely located from the baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104.

Each RP 106 includes or is coupled to one or more antennas 110 via which downlink RF signals are radiated to various items of user equipment (UE) 112 and via which uplink RF signals transmitted by UEs 112 are received.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

The system 100 is coupled to the core network 114 of each wireless network operator over an appropriate back-haul. In the exemplary embodiment shown in FIG. 1, the Internet 116 is used for back-haul between the system 100 and each core network 114. However, it is to be understood that the back-haul can be implemented in other ways.

The exemplary embodiment of the system 100 shown in FIG. 1 is described here as being implemented as a Long Term Evolution (LTE) radio access network providing wireless service using an LTE air interface. LTE is a standard developed by 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGVV) (all of which are not shown). Each controller 104 communicates with the MME and SGW in the EPC core network 114 using the LTE S1 interface. Also, each controller 104 communicates with other eNodeBs using the LTE X2 interface. For example, each controller 104 can communicate via the LTE X2 interface with an outdoor macro eNodeB (not shown) or another controller 104 in the same cluster 124 (described below) implementing a different cell 108.

If the eNodeB implemented using one or more controllers 104 is a home eNodeB, the core network 114 can also include a Home eNodeB Gateway (not shown) for aggregating traffic from multiple home eNodeBs.

The controllers 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), multiple-input-single-output (MISO), and/or beam forming schemes. For example, the controllers 104 and the radio points 106 can implement one or more of the LTE transmission modes using licensed and/or unlicensed RF bands or spectrum. Moreover, the controllers 104 and/or the radio points 106 can be configured to support multiple air interfaces and/or to support multiple wireless operators.

The controllers 104 are communicatively coupled the radio points 104 using a front-haul network 118. In the exemplary embodiment shown in FIG. 1, the front-haul 118 that communicatively couples each controller 104 to one or more RPs 106 is implemented using a standard switched ETHERNET network 120. However, it is to be understood that the front-haul between the controllers 104 and RPs 106 can be implemented in other ways.

In the exemplary embodiment shown in FIG. 1, a management system 122 is communicatively coupled to the controllers 104 and RPs 106, for example, via the Internet 116 and ETHERNET network 120 (in the case of the RPs 106).

In the exemplary embodiment shown in FIG. 1, the management system 122 communicates with the various elements of the system 100 using the Internet 116 and the ETHERNET network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment shown in FIG. 1, the system 100 comprises multiple controllers 104 that are grouped together into a cluster 124. Each cluster 124 has an associated set of RPs 106 that have been assigned to that cluster 124 and that are served by the controllers 104 included in that cluster 124. The association of radio points 106 with cells 108 is implemented using a "white list" that associates a radio point identifier (for example, a media access control (MAC) address) with an identifier associated with each cell 108 (for example, a logical or virtual cell identifier used within the context of the C-RAN 100).

Generally, for each cell 108 implemented by the C-RAN 100, the corresponding controller 104 performs the air-interface Layer-3 (L3) and Layer-2 (L2) processing as well as at least some of the air-interface Layer-1 (L1) processing for the cell 108, where each of the radio points 106 serving that cell 108 perform the L1 processing not performed by the controller 104 as well as implementing the analog RF transceiver functions.

Different splits in the air-interface processing between each controller 104 and the radio points 106 can be used. In one example, each baseband controller 104 can be configured to perform all of the digital Layer-1, Layer-2, and Layer-3 processing for the air interface, while the RPs 106 implement only the analog RF transceiver functions for the air interface and the antennas 108 associated with each RP 106. In that case, in-phase and quadrature (IQ) data representing time-domain symbols for the air interface is communicated between the controller 104 and the RPs 106.

Other splits can be used and data can communicated between the controllers 104 and the radio points 106 in other formats. In the following the description, the fronthaul data communicated between the controllers 104 and the radio points 106 for the air interface is generally referred to as "IQ data" even though such fronthaul data can take many forms, including forms that are not IQ data.

Also, the form in which front-haul data is communicated in the downlink direction (that is, the direction from the controller 104 to the RPs 106) can differ from the form in which front-haul data is communicated in the uplink direction (that is, the direction from the RPs 106 to the controller 104). Also, for a given direction (downlink or uplink), not all front-haul data needs to be communicated in the same form (that is, the front-haul data for different channels or for different resource blocks can be communicated in different ways).

In this example, at least some of the RPs 106 are implemented as multi-carrier radio points 106. For ease of explanation, all of the RPs 106 shown in FIG. 1 are described here as being implemented as multi-carrier radio points 106. However, it is to be understood that the C-RAN 100 can be implemented using both single-carrier radio points and multi-carrier radio points 106 and a given cell 108 can be served both single-carrier radio points and multi-carrier radio points 106.

FIG. 2 is a block diagram illustrating one exemplary embodiment of a multi-carrier radio point 106. As shown in FIG. 2, each multi-carrier radio point 106 comprises a plurality of radio frequency (RF) modules 202. Each RF module 202 comprises circuitry that implements the RF transceiver functions for an air interface and interfaces to one or more antennas 110 associated with that RF module 202. More specifically, in the exemplary embodiment shown in FIG. 2, each RF module 202 interfaces with a respective two antennas 110.

Those RF modules 202 that are implemented as "single-wide" RF modules 202 comprise circuitry that implements two downlink signal paths, one for each of the two antennas 110, and two uplink signals paths, one for each of the two antennas 110. Each single-wide RF module 202 is configured to be assigned a single carrier, where the two downlink signal paths and two uplink signal paths perform radio functions for that carrier. That is, for such a single-wide RF module 202, the two antennas 110 are used for sending and receiving two RF signals for two corresponding spatial streams communicated using the assigned single carrier. Those RF modules 202 that are implemented as "double-wide" RF modules 202 comprise circuitry that implements four downlink signal paths, two for each of the two antennas 110, and four uplink signals paths, two for each of the two antennas 110. Each double-wide RF module 202 is configured to be assigned two carriers, where a respective two of the four downlink signal paths and a respective two of the four uplink signal paths perform radio functions for a respective each of the two assigned carriers. That is, for such a double-wide RF module 202, the same two antennas 110 are used for sending and receiving two RF signals for two corresponding spatial streams communicated using each of the two assigned carriers.

In one exemplary implementation, each downlink signal path comprises a respective digital-to-analog converter (DAC) to convert downlink digital samples to a downlink analog signal, a respective frequency converter to upconvert the downlink analog to a downlink analog RF signal at the desired RF frequency, and a respective power amplifier (PA) to amplify the downlink analog RF signal to the desired output power for output via the antenna 110 associated with that downlink signal path. In one exemplary implementation, each uplink signal path comprises a respective low-noise amplifier (LNA) for amplifying an uplink analog RF signal received via the antenna 110 associated with the uplink signal path, a respective frequency converter to downconvert the received uplink analog RF signal to an uplink analog intermediate frequency signal, a respective analog-to-digital converter (ADC) to convert the uplink analog intermediate frequency signal to uplink digital samples. Each of the downlink and uplink signal paths can also include other conventional elements such as filters. Each RF module 202 can be implemented using one or more RF integrated circuits (RFICs) and/or discrete components.

Each multi-carrier radio point 106 further comprises at least one network interface 204 that is configured to communicatively couple the radio point 106 to the front-haul network 118. More specifically, in the exemplary embodiment shown in FIG. 2, each network interface 204 comprises an ETHERNET network interface that is configured to communicatively couple that radio point 106 to the switched ETHERNET network 120 that is used to implement the front-haul 118 for the C-RAN 100.

Each multi-carrier radio point 106 further comprises one or more programmable devices 206 that execute, or are otherwise programmed or configured by, software, firmware, or configuration logic 208 (collectively referred to here as "software"). The one or more programmable devices 206 can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices 206 are used, all of the programmable devices 206 do not need to be implemented in the same way.

The software 208 can be implemented as program instructions or configuration logic that are stored (or otherwise embodied) on an appropriate non-transitory storage medium or media 210 from which at least a portion of the program instructions or configuration logic are read by one or more programmable devices 206 for execution thereby or configuration thereof. The software 208 is configured to cause one or more devices 206 to carry out at least some of the functions described here as being performed by the radio point 106. Although the storage medium 210 is shown in FIG. 2 as being included in the radio point 106, it is to be understood that remote storage media (for example, storage media that is accessible over a network) and/or removable media can also be used. Each radio point 106 also comprises memory 212 for storing the program instructions or configuration logic and/or any related data while the functions implemented by the software 208 are performed.

The multi-carrier radio point 106 is configured to enable processing resources provided by the one or more programmable devices 206 and the hardware resources provided by the RF modules 202 to be flexibly assigned and associated with various carriers and cells 108 used for providing wireless service to UEs 112. As used herein, a "carrier" refers to a logical bi-directional RF channel used for wirelessly communicating with the UEs 112. Where frequency division duplexing (FDD) is used, each "carrier" comprises a respective physical downlink RF carrier used for downlink transmissions and a respective physical uplink RF carrier used for uplink transmissions. Where time division duplexing (TDD) is used, each "carrier" comprises a single physical RF carrier that is used for both downlink and uplink transmissions.

In the exemplary embodiment shown in FIG. 2, the one or more programmable devices 206 comprises a set of application processing units (APUs) 220, a set of real-time processing units (RPUs) 222, and programmable logic 223. In this embodiment, the RPUs 222 and programmable logic 223 are configured to perform latency sensitive functions, and the APUs 220 are used to perform all other functions.

The APUs 220 and RPUs 222 are implemented using one or more processors or processor cores (for example, using one or more ARM processors or processor cores), and the programmable logic 223 is implemented by programming or configuring one or more programmable logic devices (such as one or more FPGAs or CPLDs). The software 208 comprises software 224 executed by the APUs 220, which is also referred to here as "APU software" 224. The software 208 also comprises software 226 executed by the RPU 222, which is also referred to here as "RPU software" 226. The APU software 224 and the RPU software 226 can communicate with each other, for example, using conventional inter-process communication (IPC) techniques. The APU software 224 and RPU software 226 can communicate with the programmable logic 223 using suitable application programming interfaces (APIs) and device drivers.

The APU software 224 comprises one or more of an operating system, device drivers, networking protocol clients (not shown) as well as application layer functionality (referred to here as "applications"). The APU software 224 comprises a radio point manager 228 that orchestrates the execution of the other APU and RPU applications, including coordinating their initiation, monitoring their health, and taking corrective actions as needed.

The APU applications also include a configuration manager 230 that is configured to manage the configuration of the radio point 106. The configuration manager 230 is configured to communicate with the management system 122 and the management interfaces implemented by each of the controllers 104 assigned to that the radio point 106.

The APU applications also include a controller discovery application 232 that is configured to participate in a discovery process used for discovering controllers 104 and radio points 106 and for homing the radio point 106 to one or more controllers 104. In this example, the discovery process comprises the RP 106 sending discovery messages to all controllers 104 in the cluster 124 via the front-haul 118 that announce the presence of that RP 106. As noted above, each controller 104 that is serving a cell 108 is configured with a whitelist that identifies which RPs 106 the controller 104 should send a discovery response message to when a discovery message is received from those RPs 106 as a part of the discovery process. The RP 106 is homed to (that is, is associated with) each of the controllers 104 that sends a discovery response message to it.

The discovery response message that is sent from a controller 104 to the RP 106 includes an address or other identifier (for example, an Internet Protocol (IP) address) assigned to the controller 104 that is to be used by the RP 106 in communicating with the controller 104.

In one implementation, only a single instance of the controller discovery application 232 is instantiated and used for all of the controllers 104 assigned to that multi-carrier radio point, where that instance maintains a separate context or state machine for each controller 104 associated with the multi-carrier radio point 106. In other implementations, a separate instance of the controller discovery application 232 is instantiated and used for each of the controllers 104 assigned to that multi-carrier radio point, where each instance maintains a respective context or state machine for one of the controllers 104 associated with the multi-carrier radio point 106.

In this exemplary embodiment, the APU applications also include a multi-carrier manager application 234 and per-carrier manager applications 236 and radio controller applications 238. Only one instance of the multi-carrier manager application 234 is instantiated at any time. The multi-carrier manager application 234 is configured to bind instances of the per-carrier manager applications 236, the radio controller application 238, and L1 software instances to the associated carrier and hardware resources. The per-carrier manager application 236 is assigned to a particular carrier of the RP 106 and is configured to act as the primary peer entity for the controller 104 that is associated with that carrier for all operation, administration, and management communications (including, for example, configuration communications and reporting and monitoring communications). The per-carrier manager application 236 is also configured to control and act as the master for the one or more instances of the radio controller application 238 that are assigned to the same controller 104. For each RF module 202 assigned to a controller 104, a respective instance of the radio controller application 238 is instantiated in order to configure and control that RF module 202.

In the exemplary embodiment shown in FIG. 2, the Layer 1 (L1) processing resources are used to implement a L1 processing chain for each carrier of the RP 106. The Layer 1 (L1) processing resources include a manager application 240 that runs on the set of APUs 220 included in the RP 106. This manager application is also referred to here as the "APU L1 manager application" 240. An instance of the APU L1 manager application 240 is instantiated for each carrier of the RP 106 (and the associated L1 processing chain) and is configured to configure the L1 processing that is performed by L1 processing resources provided by the RP 106 (including applications running on the set of APUs 220 and on the set of RPUs 222 and the programmable logic 223). The Layer 1 (L1) processing resources also include a manager application 242 that runs on the set of RPUs 222 included in the RP 106. This manager application is also referred to here as the "RPU L1 manager application" 242. An instance of the RPU L1 manager application 242 is instantiated for each carrier of the RP 106 (and the associated L1 processing chain) and is configured to perform various latency sensitive L1 signal processing tasks for that carrier using the set of RPUs 222. Also, in this exemplary embodiment, the Layer 1 (L1) processing resources also include an L1 co-processor application 244 that runs on the set of APUs 220 included in the RP 106. An instance of the L1 co-processor application 244 is instantiated for each carrier of the RP 106 (and the associated L1 processing chain) and is configured to perform various L1 signal processing tasks for that carrier using the set of APUs 220.

Also, in this exemplary embodiment, the Layer 1 (L1) processing resources also include Layer 1 (L1) baseband functions logic 251 implemented by the configuration logic 227 for the programmable logic device 223. In this embodiment, a respective instance of the L1 baseband logic 251 is created at system start-up for each of the possible carriers that can be supported by the radio point 106. For example, where the radio point 106 can support up to four carriers (such as in the examples shown in FIGS. 4A-4D), four instances of the programmable logic 251 are created at system start-up. The instances of the L1 baseband logic 251 are bound to other parts of the radio point 106 as needed as described below.

The various instances of the applications that are associated with different controllers, carriers, and RF modules 202, as the case may be, are isolated from one another. Also, it is to be understood that the various instances may be implemented using shared physical or logical resources.

The multi-carrier radio point 106 is configured so that the processing and hardware resources provided by the radio point 106 can be associated with controllers 104 in the cluster 124 in a flexible manner. A single multi-carrier radio point 106 can be used with multiple controllers 104 to serve multiple cells 108, where the processing and hardware resources used for the multiple controllers 104 need not be configured and used in the same way. The multi-carrier radio point 106 is not "hardwired" to operate in certain radio point configurations. Instead, the multi-carrier radio point 106 can be configured at run-time to use the desired radio point configurations. Each controller 104 that is used with the multi-carrier radio point 106 automatically discovers the radio point 106 and claims and configures the resources it needs from those that are provided by the radio point 106.

For example, an RF plan can be developed for the site 102 that identifies where the coverage areas of the various cells 108 need to be located and where radio points 106 need to be deployed in order to provide the desired coverage areas. The association of radio points 106 and cells 108 can be configured by specifying which radio points 106 are to be associated with each cell 108. The association of radio points 106 with cells 108 is implemented using a "white list" that associates a radio point identifier (for example, a media access control (MAC) address) with an identifier associated with each cell 108 (for example, a logical or virtual cell identifier used within the context of the C-RAN 100). When a controller 104 in the cluster 124 is configured to serve a particular cell 108, the controller 104 uses the white list to determine which radio points 106 should be homed to that controller 104 in order to serve that cell 108. The controller 104 then uses this information to claim and configure the relevant resources of the assigned radio points 106 at run time. In this way, the various radio points 106 do not need to be individually manually configured. Instead, the controllers 104 can automatically discover, claim, and configure the resources provided by the multi-carrier radio points 106.

Additional examples and details regarding this are provided below in connection with FIGS. 3 and 4A-4D.

FIG. 3 comprises a high-level flowchart illustrating one exemplary embodiment of a method 300 of configuring a multi-carrier radio point 106 used in a C-RAN 100. The embodiment of method 300 shown in FIG. 3 is described here as being implemented in the C-RAN 100 described above in connection with FIG. 1, though it is to be understood that other embodiments can be implemented in other ways.

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The particular radio point 106 for which method 300 is described here as being performed is referred to here as the "current" radio point 106.

Method 300 is performed when the current radio point 106 is initially powered on and when the radio point rebooted.

Method 300 comprises performing a discovery process in order for the current radio point 106 to be discovered by the controllers 104 in the C-RAN 100 (block 302). In this exemplary embodiment, the discovery process comprises the current radio point 106 sending a discovery messages to all controllers 104 in the cluster 124 via the front-haul switched ETHERNET network 120 that announce the presence of the current radio point 106. As noted above, there is a whitelist that associates each cell 108 provided by the C-RAN with a set of radio points 106 used to serve that cell 108. When each controller 104 that is currently serving a cell 108 receives a discovery message from a radio point 106, the controller 104 uses the whitelist to check if the radio point 106 that sent the discovery message is assigned to that cell 108. If the radio point 106 that sent the discovery message is not assigned to that cell 108, the serving controller 104 does not send a response to the discovery message. If the radio point 106 that sent the discovery message is assigned to that cell 108, the serving controller 104 sends a discovery response message to that radio point 106 indicating that the radio point 106 should be homed to that controller 104. The discovery response message that is sent from a controller 104 to the RP 106 includes an address or other identifier (for example, an Internet Protocol (IP) address) assigned to the controller 104 that is to be used by the radio point 106 in communicating with the controller 104. The current radio point 106 can be homed to multiple controllers 104 in order to serve multiple cells 108.

In this exemplary embodiment, the discovery process is done by the instance of the controller discovery application 232.

Method 300 further comprises receiving, from each controller 104 homed to the current radio point 106, a request to use certain carriers and processing and hardware resources provided by the current radio point 106 in a particular configuration (block 304), assigning carriers and processing and hardware resources provided by the current radio point 106 to each controller 104 based on the received requests (block 306), and configuring the carriers and processing and hardware resources assigned to each controller 104 in order to instantiate a radio point instance based on the received requests (block 308).

As used here, a "radio point instance" refers to the processing and hardware resources assigned to a particular controller 104 in order to implement a radio point entity.

In this exemplary embodiment, each controller 104 that is homed to the current radio point 106 sends one or more messages to the current radio point 106 that requests the use of certain carriers and processing and hardware resources provided by the current radio point 106 in a particular configuration to instantiate a radio point instance. The requests for carrier and processing and hardware resources received at the current multi-carrier radio point 106 are processed by the multi-carrier manager 234. For each controller 104 homed to the current radio point 106 that sends a request to the current radio point 106, the multi-carrier manager 234 assigns to that controller 104 the requested one or more carriers and requested one or more RF modules 202, if available. The multi-carrier manager 234 instantiates a respective instance of the per-carrier manager 236, APU L1 manager 240, RPU L1 manager 242, and (if used) APU L1 co-processing application 244 for each carrier assigned to a requesting controller 104. Moreover, the multi-carrier manager 234 assigns one of the instances of L1 baseband logic 251 to each carrier assigned to a requesting controller 104. Also, the multi-carrier manager 234 instantiates a respective instance of the radio controller application 236 for each RF module 202 assigned to a requesting controller 104. The multi-carrier manager 234, for each requesting controller 104, then binds the various instances associated with that controller 104 to each other and to the assigned carriers and RF modules 202 (and configures the various instances) in order to implement the requested configuration and radio point instance. If the requested carriers and processing and hardware resources are not available, an error is signaled.

In this way, the carriers and processing and hardware resources provided by the multi-carrier radio point 106 can be configured in a flexible manner by having the controllers 104 automatically discover, claim, and configure the resources provided by the multi-carrier radio points 106.

FIGS. 4A-4D are block diagrams illustrating various configurations of the multi-carrier radio point 106 shown in FIG. 2. In the examples illustrated in the FIGS. 4A-4D, the multi-carrier radio point 106 is configured to support up to four bi-directional carriers and includes four RF modules 202, with each RF module 202 including two downlink and two uplink signal paths and two antennas 110. Also, in these example, L1 APU co-processing applications 244 are not used. It is to be understood, however, that other embodiments can be implemented in other ways.

Figure 4A:
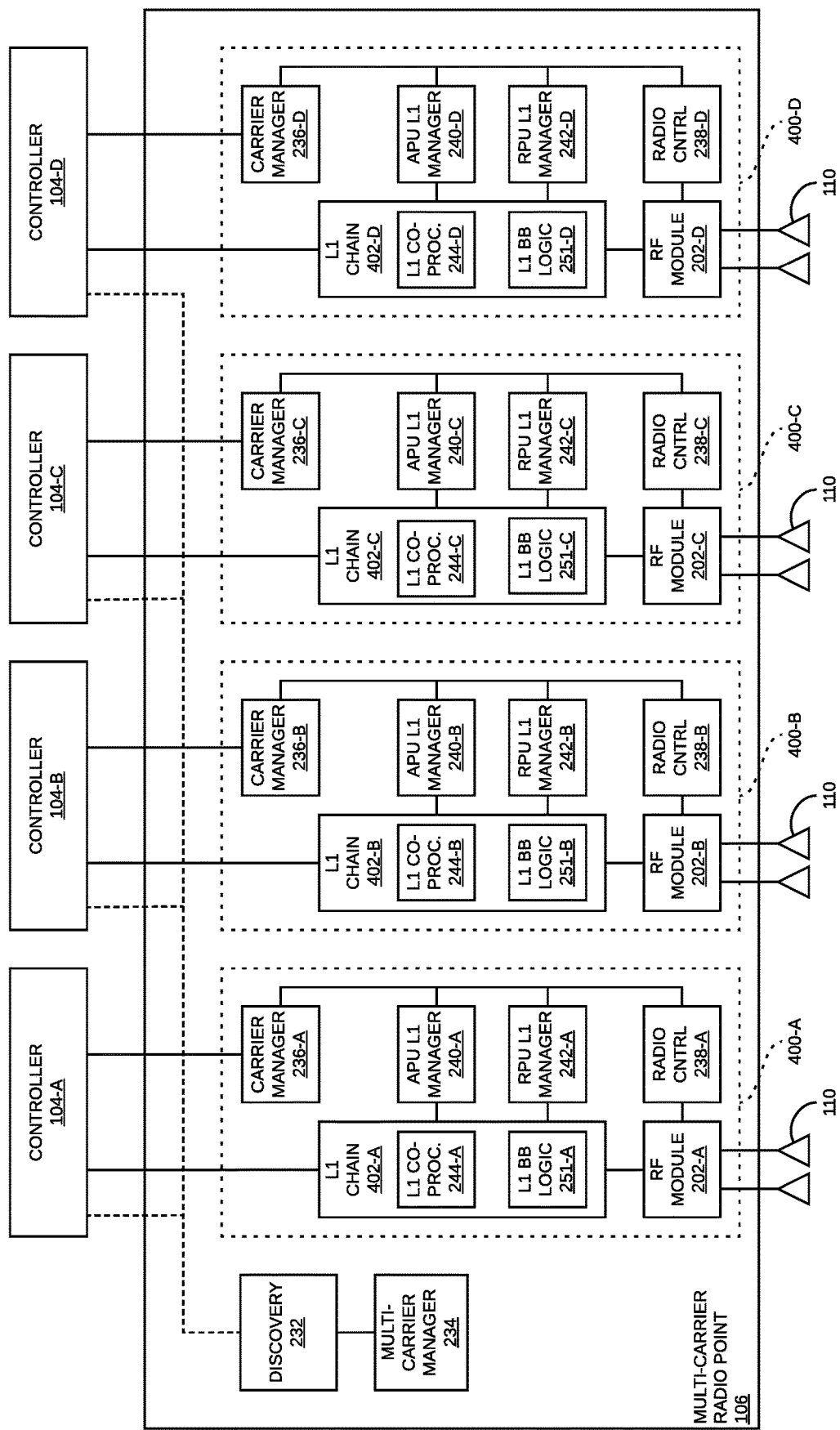
Figure 4B:
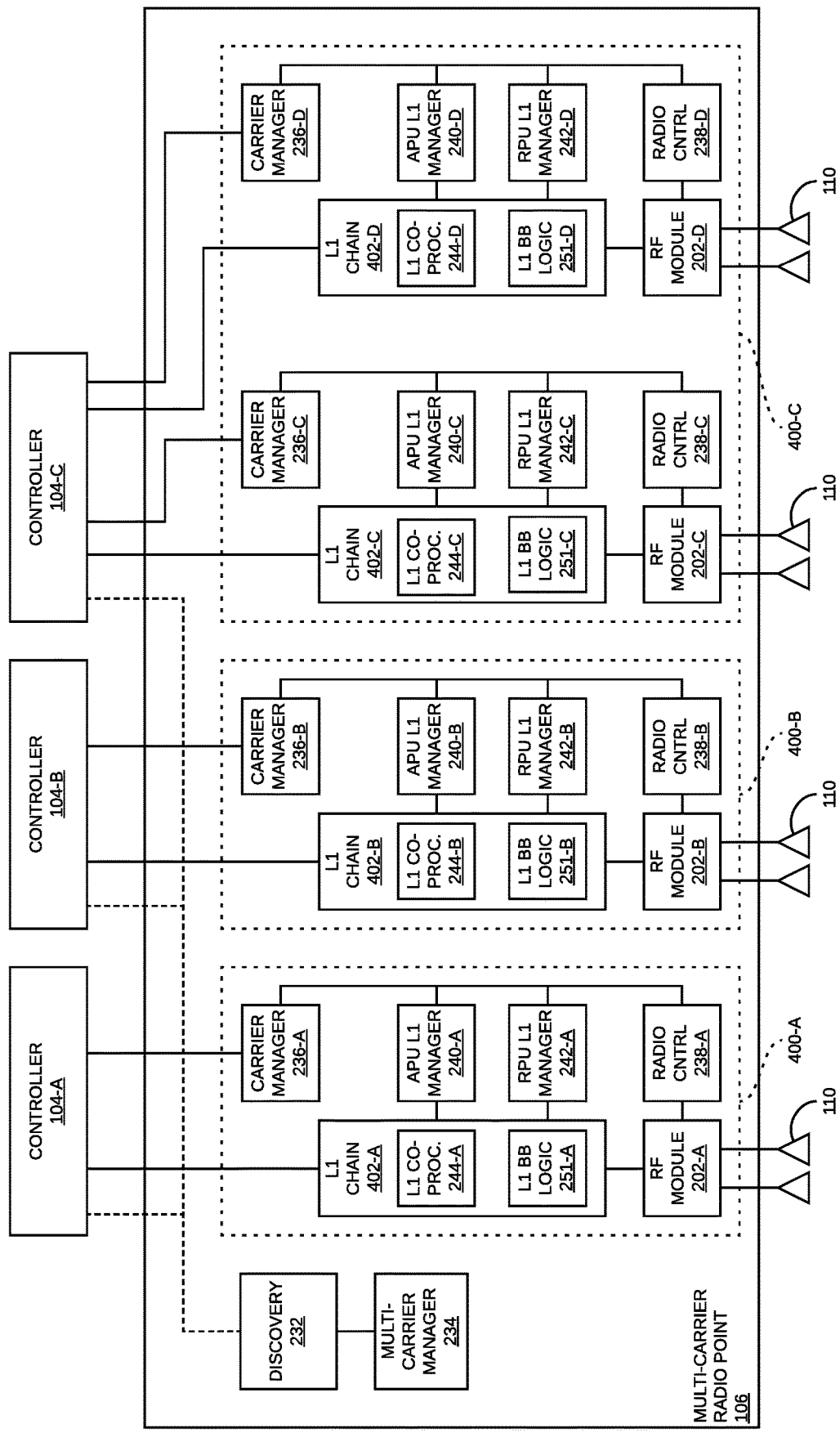
Figure 4C:
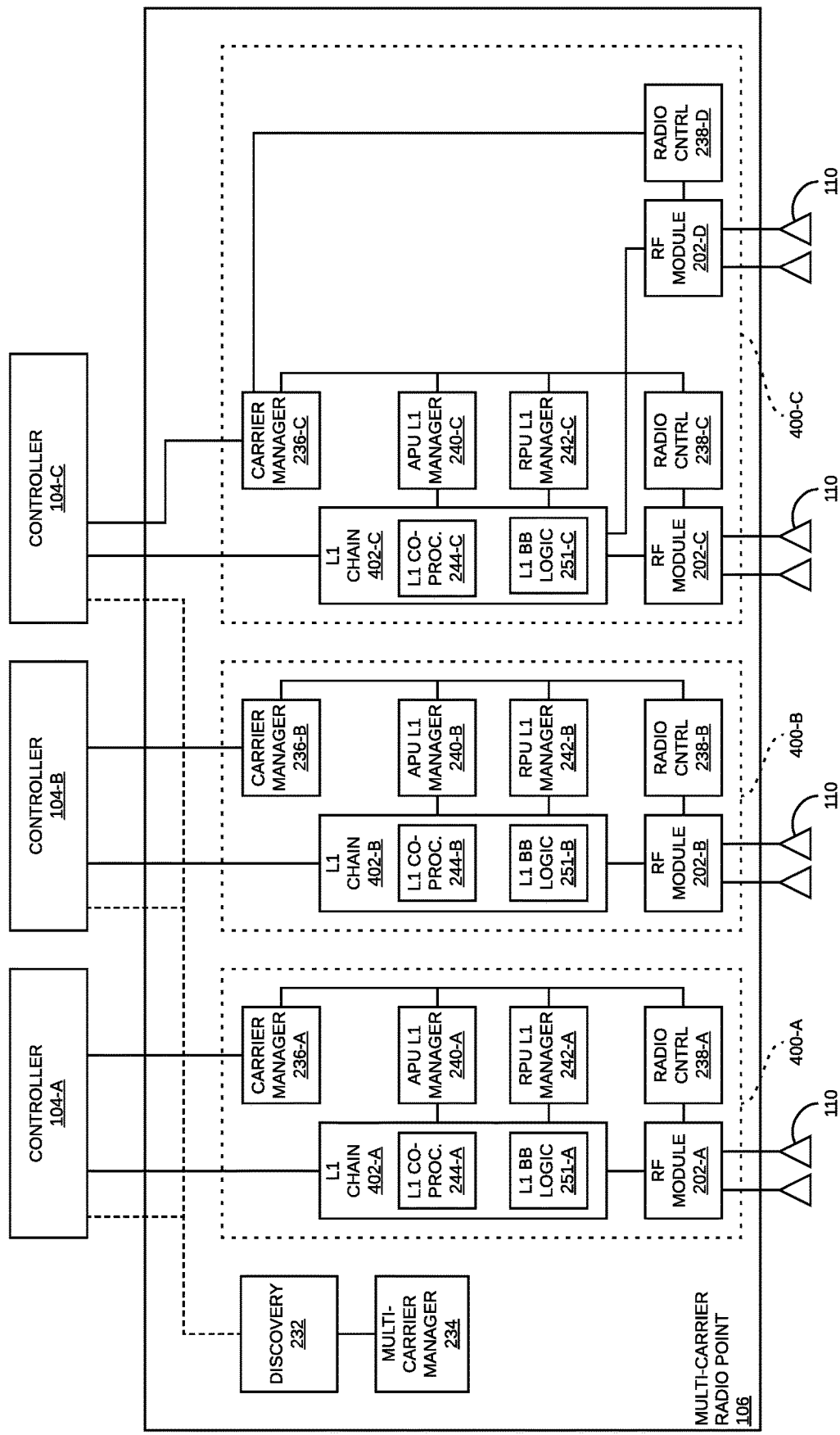
Figure 4D:
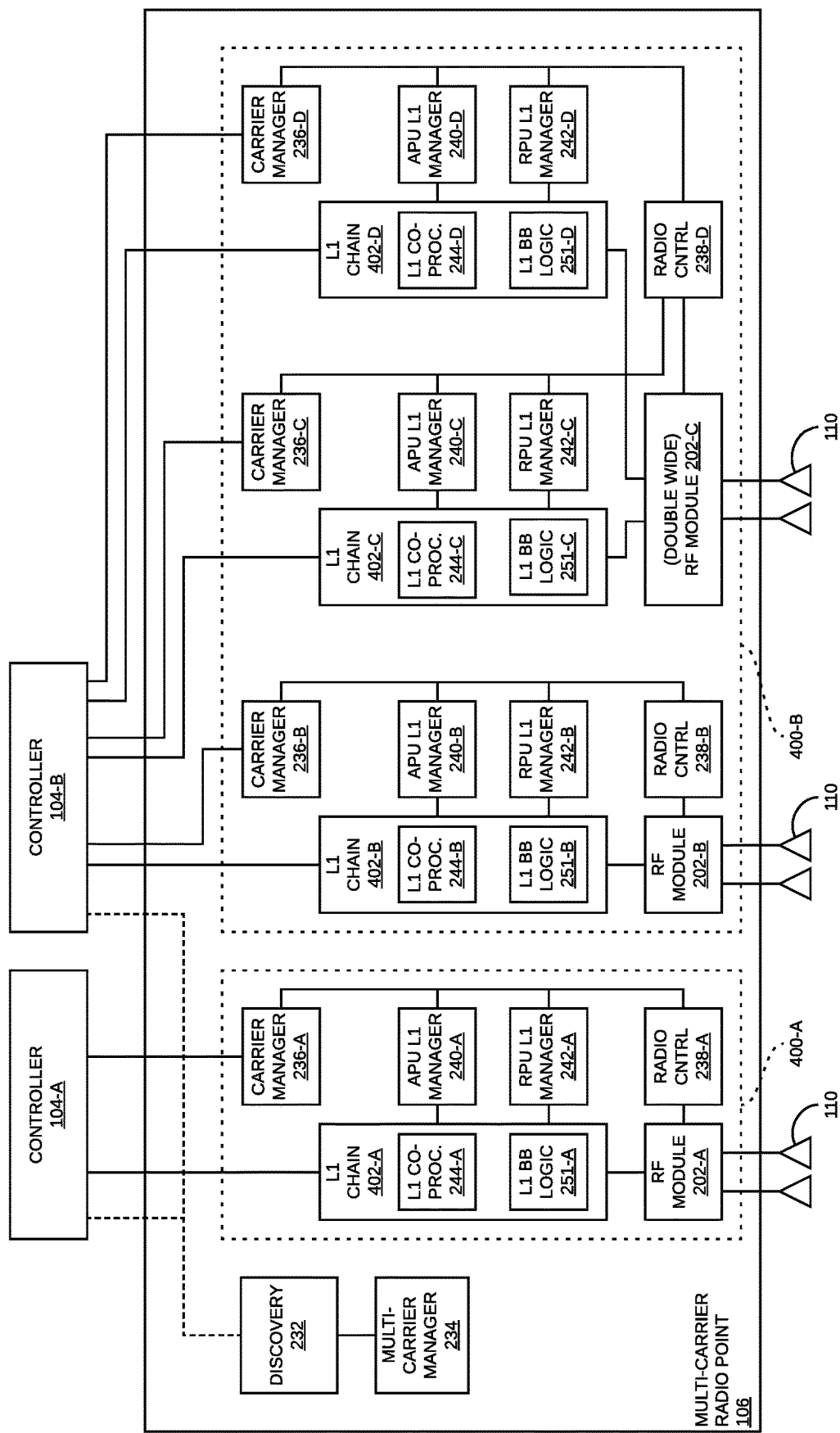

Moreover, FIG. 4A illustrates a "homogenous" configuration in which all of the radio point instances implemented by the multi-carrier radio point 106 are configured in the same way, whereas FIGS. 4B-4D all illustrates different "heterogenous" configurations in which at least one of the radio point instances implemented by the multi-carrier radio point 106 differs from at least one of the other radio point instances implemented by that multi-carrier radio point 106.

In the example shown in FIG. 4A, the multi-carrier radio point 106 is homed to four controllers 104 and instantiates four respective radio point instances 400 (individually referenced in FIG. 4A using the suffixes "-A", "-B", "-C", and "-D", respectively). Each controller 104 is assigned a single carrier and RF module 202. Each of the four carriers implements a respective 2×2 MIMO LTE channel. The baseband streams for each 2×2 MIMO LTE channel are processed by a respective single L1 signal processing chain 402 including appropriate software and programmable logic resources 244 (if used) and 251 (all of which are individually referenced in FIG. 4A using the suffixes "-A", "-B", "-C", and "-D", respectively) assigned to the associated carrier.

In this example, the multi-carrier manager 234 instantiates four instances of each of the per-carrier manager 236, APU L1 manager 240, and RPU L1 manager 242 (individually referenced in FIG. 4A using the suffixes "-A", "-B", "-C", and "-D", respectively), and binds one of each of the four instances to a respective one of the four assigned carriers (and to the controller 104 associated with the assigned carrier). Moreover, the multi-carrier manager 234 binds one instance of both the APU L1 manager 240 and the RPU L1 manager 242 to a respective one of the L1 processing chains 402 (and the software and programmable logic resources 244 and 251 used therein). The APU L1 manager 240 and the RPU L1 manager 242 both interact with the software and programmable logic 244 (if used) and 251 of the associated L1 processing chain 402 in connection with configuring and managing the L1 processing implemented by that chain 402. Also, in this example, the multi-carrier manager 234 instantiates four instances of the radio controller application 238 (individually referenced in FIG. 4A using the suffixes "-A", "-B", "-C", and "-D", respectively) and binds one of the four instances to a respective one of the four assigned RF modules 202 (and to the controller 104 associated with the assigned RF module 202). The multi-carrier manager 234 then configures the instances of the per-carrier manager 236, APU L1 manager 240, RPU L1 manager 242, and radio controller application 238 assigned to each controller 104 to implement a 2×2 MIMO LTE configuration, where each cell is served using a respective one of the RF modules 202.

The two downlink and uplink antennas streams for each 2×2 MIMO channel are processed by the L1 signal processing chain 402 (and the software and programmable logic resources 244 and 251 included therein) assigned to the associated carrier. Also, the two downlink antenna streams for each 2×2 MIMO channel are processed by a respective two downlink signal paths in a respective one of the RF modules 202-A, 202-B, 202-C, and 202-D for transmission from a respective one of the antennas 110. Likewise, the two uplink antenna streams received via a respective one of the antennas 110 for each 2×2 MIMO channel are processed by a respective two uplink signal paths in a respective one of the RF modules 202-A, 202-B, 202-C, and 202-D.

In the example shown in FIG. 4B, the multi-carrier radio point 106 is homed to three controllers 104 and instantiates three respective radio point instances 400 (individually referenced in FIG. 4B using the suffixes "-A", "-B", and "-C", respectively). As with the example shown in FIG. 4A, each of two controller 104-A and 104-B is assigned a single carrier and single RF module 202-A and 202-B, respectively, and each of the two carriers implements a respective 2×2 MIMO LTE channel. The baseband streams for each 2×2 MIMO LTE channel are processed by a respective single L1 signal processing chain 402 including appropriate software and programmable logic resources 244 (if used) and 251 (all of which are individually referenced in FIG. 4B using the suffixes "-A" and "-B", respectively) assigned to the associated carrier. The processing and hardware resources for each 2×2 MIMO LTE channel are bound and configured in the same way shown in FIG. 4A, the description of which is not repeated here for the sake of brevity.

The third controller 104-C is assigned two carriers and two RF modules 202-C and 202-D. Each of the two carriers implement a respective 2×2 MIMO LTE channel. In this example, the two 2×2 MIMO LTE channels are aggregated using LTE carrier aggregation. The baseband streams for each 2×2 MIMO LTE channel are processed by a respective single L1 signal processing chain 402 including appropriate software and programmable logic resources 244 (if used) and 251 (all of which are individually referenced in FIG. 4B using the suffixes "-C" and "-D", respectively) assigned to the associated carrier.

In this example, for the third controller 104-C, the multi-carrier manager 234 instantiates two instances of each of the per-carrier manager 236, APU L1 manager 240, and RPU L1 manager 242 (individually referenced in FIG. 4B using the suffixes "-C" and "-D") and binds one of each of the two instances to a respective one of the two assigned carriers (and to the third controller 104-C, which is assigned the two carriers). Moreover, the multi-carrier manager 234 binds one instance of both the APU L1 manager 240 and the RPU L1 manager 242 to a respective one of the L1 processing chains 402 (and the software and programmable logic resources 244 and 251 used therein). The APU L1 manager 240 and the RPU L1 manager 242 both interact with the software and programmable logic 244 (if used) and 251 of the associated L1 processing chain 402 in connection with configuring and managing the L1 processing implemented by that chain 402. Also, in this example, the multi-carrier manager 234 instantiates two instances of the radio controller application 238 (individually referenced in FIG. 4B using the suffixes "-C" and "-D") and binds one of the two instances to a respective one of the two assigned RF modules 202-C and 202-D (and to the third controller 104-C, which is assigned the two RF modules 202-C and 202-D). The multi-carrier manager 234 then configures the instances of the per-carrier manager 236, APU L1 manager 240, RPU L1 manager 242, and radio controller application 238 assigned to the third controller 104-C to implement a two-carrier carrier aggregation LTE configuration, where the associated cell is served using the two RF modules 202-C and 202-D. In this carrier aggregation configuration, each of the two aggregated carriers both implement a respective 2×2 MIMO LTE channel, which are then aggregated. Each of these 2×2 MIMO LTE channels are configured in the same general manner described above with respect to the carriers assigned to controllers 104-A and 104-B.

In the example shown in FIG. 4C, the multi-carrier radio point 106 is homed to three controllers 104 and instantiates three respective radio point instances 400 (individually referenced in FIG. 4C using the suffixes "-A", "-B", and "-C", respectively). As with the example shown in FIG. 4A, each of two controller 104-A and 104-B is assigned a single carrier and single RF module 202-A and 202-B, respectively, and each of the two carriers implements a respective 2×2 MIMO LTE channel. The baseband streams for each 2×2 MIMO LTE channel are processed by a respective single L1 signal processing chain 402 including appropriate software and programmable logic resources 244 (if used) and 251 (all of which are individually referenced in FIG. 4C using the suffixes "-A" and "-B", respectively) assigned to the associated carrier. The processing and hardware resources for each 2×2 MIMO LTE channel are bound and configured in the same way shown in FIG. 4A, the description of which is not repeated here for the sake of brevity.

In the example shown in FIG. 4C, the third controller 104-C is assigned one carrier and two RF modules 202-C and 202-D. A single carrier is used to implement a single 4×4 MIMO LTE channel. The baseband streams for the single 4×4 MIMO channel are processed by a single L1 signal processing chain 402 including appropriate software and programmable logic resources 244 (if used) and 251 (all of which are individually referenced in FIG. 4C using the suffix "-C") assigned to the associated carrier.

For the third controller 104-C, the multi-carrier manager 234 instantiates one instance of each of the per-carrier manager 236, APU L1 manager 240, and RPU L1 manager 242 (individually referenced in FIG. 4C using the suffix "-C") and binds each of the instances to the assigned carrier (and to the third controller 104-C, which is assigned the carrier). Moreover, the multi-carrier manager 234 binds the instance of both the APU L1 manager 240-C and the RPU L1 manager 242-C to the respective L1 processing chain 402-C (and the software and programmable logic resources 244-C and 251-C used therein). The APU L1 manager 240-C and the RPU L1 manager 242-C both interact with the software and programmable logic 244-C (if used) and 251-C of the associated L1 processing chain 402-C in connection with configuring and managing the L1 processing implemented by that chain 402-C. Also, in this example, the multi-carrier manager 234 instantiates two instances of the radio controller application 238 (individually referenced in FIG. 4C using the suffixes "-C" and "-D") and binds both of the instances to the assigned carrier. Moreover, the multi-carrier manager 234 binds one of the two instances of the radio controller application 238 to a respective one of the two assigned RF modules 202-C and 202-D (and to the third controller 104-C, which is assigned the two RF modules 202-C and 202-D). The multi-carrier manager 234 then configures the instances of the per-carrier manager 236, APU L1 manager 240, RPU L1 manager 242, and radio controller application 236 assigned to the third controller 104-C to implement a single-carrier 4×4 MIMO LTE configuration, where the associated cell is served using the two RF modules 202-C and 202-D. Each of the two RF modules 202-C and 202-D provide two downlink signal paths, for a total of four downlink signal paths, each of which is used to process one of the four downlink antenna streams for transmission from a respective one of the antennas 110. Likewise, each of the two RF modules 202-C and 202-D provide two uplink signal paths, for a total of four uplink signal paths, each of which is used to process one of the four uplink antenna streams received via a respective one of the antennas 110.

In the example shown in FIG. 4D, the multi-carrier radio point 106 is homed to two controllers 104 and instantiates two respective radio point instances 400 (individually referenced in FIG. 4D using the suffixes "-A" and "-B", respectively). One controller 104-A is assigned a single carrier and single RF module 202-A. The assigned carrier implements a 2×2 MIMO LTE channel. The baseband streams for the 2×2 MIMO LTE channel are processed by a single L1 signal processing chain 402 including appropriate software and programmable logic resources 244 (if used) and 251 (all of which are individually referenced in FIG. 4D using the suffix "-A") assigned to the associated carrier. The processing and hardware resources for the 2×2 MIMO LTE channel are bound and configured in the same way shown in FIG. 4A, the description of which is not repeated here for the sake of brevity.

The second controller 104-B is assigned three carriers and two RF modules 202-B and 202-C. The second controller 104-B uses the three carriers to implement a LTE Licensed Assisted Access (LAA) configuration, where one carrier is used as the licensed primary carrier for implementing a single-carrier 2×2 MIMO LTE channel and the other two carriers are used as unlicensed supplemental carriers. The baseband streams for the 2×2 MIMO LTE channel are processed by a single L1 signal processing chain 402 including appropriate software and programmable logic resources 244 (if used) and 251 (all of which are individually referenced in FIG. 4D using the suffix "-B") assigned to the associated carrier. Also, the baseband streams for each of the two supplemental unlicensed carriers are processed by a respective single L1 signal processing chain 402 including appropriate software and programmable logic resources 244 (if used) and 251 (all of which are individually referenced in FIG. 4D using the suffixes "-C" and "-D", respectively).

In this example, for the second controller 104-B, the multi-carrier manager 234 instantiates three instances of each of the per-carrier manager 236, APU L1 manager 240, and RPU L1 manager 242 (individually referenced in FIG. 4D using the suffixes "-B", "-C", and "-D") and binds one of each of the three instances to a respective one of the three assigned carriers (one of which is a licensed carrier and the other two of which are unlicensed carriers). Moreover, the multi-carrier manager 234 binds one instance of both the APU L1 manager 240 and the RPU L1 manager 242 to a respective one of the L1 processing chains 402 (and the software and programmable logic resources 244 and 251 used therein). The APU L1 manager 240 and the RPU L1 manager 242 both interact with the software and programmable logic 244 (if used) and 251 of the associated L1 processing chain 402 in connection with configuring and managing the L1 processing implemented by that chain 402. Also, in this example, the multi-carrier manager 234 instantiates two instances of the radio controller application 238 (individually referenced in FIG. 4D using the suffixes "-B" and "-C") and binds one of the two instances to a respective one of the two assigned RF modules 202-B and 202-C (and to the second controller 104-B, which is assigned the two RF modules 202-B and 202-C). The multi-carrier manager 234 then configures one of the instances (the one referenced with the suffix "-B") of the per-carrier manager 236, APU L1 manager 240, RPU L1 manager 242, and radio controller application 236 assigned to the second controller 104-B to use one carrier as the licensed primary carrier for implementing a single-carrier 2×2 MIMO LTE channel. The carrier implements a 2×2 MIMO LTE channel using the associated L1 processing chain 402-B and is configured in the same general manner described above with respect to the example shown in FIG. 4A.

The multi-carrier manager 234 also configures the others instances (the ones referenced with the suffixes "-C" and "-D") of the per-carrier manager 236, APU L1 manager 240, and RPU L1 manager 242 assigned to the second controller 104-B and the other instance (the one referenced with the suffix "-C") of the radio controller application 236 assigned to the second controller 104-B to use the other two carriers as unlicensed supplemental carriers. In this example, the RF module 202-C assigned to the unlicensed supplemental carriers is a double-wide RF module 202-C that can be assigned two carriers and comprises four downlink signal paths and four uplink signal paths. In this configuration, the double-wide RF module 202-C is able to implement the radio functions for the respective two downlink and uplink baseband streams for each of the two assigned unlicensed carriers, where the corresponding two downlink and uplink RF signals for each of the two assigned unlicensed carriers are sent and received using one of the same two antennas 110. The multi-carrier manager 234 binds the two supplemental unlicensed carriers (and the related software instances) to this RF module 202-C. One L1 processing chain 402-C processes the two downlink and uplink baseband streams for one of the assigned unlicensed carriers, and another L1 processing chain 402-D processes the two downlink and uplink baseband streams for the other assigned unlicensed carrier.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a multi-carrier radio point for a central radio access network (C-RAN) comprising a plurality of controllers and a plurality of radio points, the multi-carrier radio point comprising: at least one programmable device configured to provide processing resources for providing wireless service to a plurality of items of user equipment (UEs) using multiple bi-directional radio frequency carriers; at least one network interface configured to communicatively couple the multi-carrier radio point to a front-haul network in order to communicate with the plurality of controllers; and a plurality of radio frequency modules configured to wirelessly communicate using one or more antennas; wherein at least one programmable device is configured to: perform a discovery process in order for the multi-carrier radio point to be associated with one or more of the controllers; receive requests from one or more controllers for the processing resources and the radio frequency modules; assign the processing resources and the radio frequency modules to the one or more controllers based on the requests; and configure the processing resources and the radio frequency modules to instantiate one or more radio points instances, each radio point instance homed to a respective one of the controllers, each radio point instance implementing a respective carrier configuration.

Example 2 includes the multi-carrier radio point of Example 1, wherein the respective processing resources and the respective radio frequency modules assigned to different controllers are configured in different ways.

Example 3 includes the multi-carrier radio point of any of Examples 1-2, wherein the radio point instances for different controllers are configured in different ways.

Example 4 includes the multi-carrier radio point of any of Examples 1-3, wherein at least one programmable device is configured to assign the processing resources and the radio frequency modules to the one or more controllers based on the requests by doing the following: for each controller that is associated with the radio point: assign one or more carriers to that controller; assign one or more radio frequency modules to that controller, each radio frequency module associated with one or more carriers assigned to that controller; for each carrier assigned to that controller, instantiate a per-carrier manager instance configured to communicate data for that carrier with that controller over the front-haul network and instantiate a Layer-1 manager instance configured to manage Layer-1 processing performed for that carrier; and for each radio frequency module assigned to that controller, instantiate a radio controller instance configured to manage that radio frequency module.

Example 5 includes the multi-carrier radio point of Example 4, wherein the programmable devices comprise an application programming unit configured to execute software; and wherein the software comprises a multi-carrier manager instance that is configured to assign, to each controller that is associated with the radio point, the respective one or more carriers and the respective one or more radio frequency modules and instantiate each per-carrier manager instance, Layer-1 manager instance, and radio controller instance for that controller.

Example 6 includes the multi-carrier radio point of any of Examples 1-5, wherein the programmable devices comprise an application programming unit configured to execute software; and wherein the software comprises a controller discovery instance that is configured to send discovery message over the front-haul network to the controllers.

Example 7 includes the radio point of any of Examples 1-6, wherein at least one programmable device is configured to support configuring at least one of the radio point instances to support at least one of the following: a first carrier configuration for a given radio point instance in which the associated controller is assigned a single carrier and a single RF module that is associated with the respective single carrier for said controller; a second carrier configuration for a given radio point instance in which the associated controller is assigned multiple carriers, wherein each of the multiple carriers is associated with a respective single radio frequency module; a third carrier configuration for a given radio point instance in which the associated controller is assigned one carrier that is used for multiple-input multiple-output (MIMO) communications, wherein multiple radio frequency modules are associated with the single carrier; and a fourth carrier configuration for a given radio point instance in which the associated controller is assigned multiple carriers, wherein one of the multiple carriers comprises a licensed RF carrier associated with a first single radio frequency module and the remaining carriers comprise unlicensed carriers associated with a second single radio frequency module.

Example 8 includes the multi-carrier radio point of Example 7, wherein the second carrier configuration is used for communicating using Long-Term Evolution (LTE) Carrier Aggregation (CA).

Example 9 includes the multi-carrier radio point of any of Examples 7-8, wherein each RF module supports communicating using two antennas and the third carrier configuration is used with 4×4 MIMO communications.

Example 10 includes the multi-carrier radio point of any of Examples 7-9, wherein the fourth radio point instance configuration is used for communicating using Long-Term Evolution (LTE) Licensed Assisted Access (LAA).

Example 11 includes the multi-carrier radio point of any of Examples 1-10, wherein the at least one programmable device comprises at least one application processing unit (APU), at least real-time processing unit (RPU), and at least one programmable logic device.

Example 12 includes the multi-carrier radio point of any of Examples 1-11, wherein each of the radio frequency modules comprises respective circuitry that includes at least a digital-to-analog converter, power amplifier, low-noise amplifier, and analog-to-digital converter.

Example 13 includes the multi-carrier radio point of Example 12, wherein the respective circuitry for each radio frequency module further comprises a respective upconverter and downconverter.

Example 14 includes the multi-carrier radio point of any of Examples 1-13, wherein at least one of the radio frequency modules is configured to be assigned multiple carriers.

Example 15 includes the multi-carrier radio point of any of Examples 1-14, wherein each bi-directional radio frequency channel is implemented using time division duplexing and/or frequency division duplexing.

Example 16 includes the multi-carrier radio point of any of Examples 1-15, wherein the at least one network interface comprises an Ethernet network interface to couple the radio point to a switch Ethernet network used to implement the front-haul network.

Example 17 includes a method for a multi-carrier radio point used with a central radio access network (C-RAN) comprising a plurality of controllers and a plurality of radio points, the multi-carrier radio point comprising at least one programmable device configured to provide processing resources for providing wireless service to a plurality of items of user equipment (UEs) using multiple bi-directional radio frequency carriers and a plurality of radio frequency modules configured to wirelessly communicate using one or more antennas, the method comprising: performing a discovery process in order for the radio point to be associated with one or more of the controllers; receiving at the radio point requests from one or more controllers for the processing resources and the radio frequency modules; assigning the processing resources and the radio frequency modules to the one or more controllers based on the requests; and configuring the processing resources and the radio frequency modules to instantiate one or more radio points instances, each radio point instance homed to a respective one of the controllers, each radio point instance implementing a respective carrier configuration.

Example 18 includes the method of Example 17, wherein the respective processing resources and the respective radio frequency modules assigned to different controllers are configured in different ways.

Example 19 includes the method of any of Examples 17-18, wherein the radio point instances for different controllers are configured in different ways.

Example 20 includes the method of any of Examples 17-19, wherein assigning the processing resources and the radio frequency modules to the one or more controllers based on the requests comprises: for each controller that is associated with the radio point: assigning one or more carriers to that controller; assigning one or more radio frequency modules to that controller, each radio frequency module associated with one or more carriers assigned to that controller; for each carrier assigned to that controller, instantiating a per-carrier manager instance configured to communicate data for that carrier with that controller over the front-haul network and instantiate a Layer-1 manager instance configured to manage Layer-1 processing performed for that carrier; and for each radio frequency module assigned to that controller, instantiating a radio controller instance configured to manage that radio frequency module.

Example 21 includes the method of any of Examples 17-20, wherein the radio point is configured to support configuring at least one of the radio point instances to support at least one of the following: a first carrier configuration for a given radio point instance in which the associated controller is assigned a single carrier and a single radio frequency module that is associated with the respective single carrier for said controller; a second carrier configuration for a given radio point instance in which the associated controller is assigned multiple carriers, wherein each of the multiple carriers is associated with a respective single radio frequency module; a third carrier configuration for a given radio point instance in which the associated controller is assigned one carrier that is used for multiple-input multiple-output (MIMO) communications, wherein multiple radio frequency modules are associated with the single carrier; and a fourth carrier configuration for a given radio point instance in which the associated controller is assigned multiple carriers, wherein one of the multiple carriers comprises a licensed RF carrier associated with a first single radio frequency module and the remaining carriers comprise unlicensed carriers associated with a second single radio frequency module.

Example 22 includes the method of Example 21, wherein the second carrier configuration is used for communicating using Long-Term Evolution (LTE) Carrier Aggregation (CA).

Example 23 includes the method of any of Examples 21-22, wherein each RF module supports communicating using two antennas and the third carrier configuration is used with 4×4 MIMO communications.

Example 24 includes the method of any of Examples 21-23, wherein the fourth configuration is used for communicating using Long-Term Evolution (LTE) Licensed Assisted Access (LAA).

Example 25 includes the method of any of Examples 17-24, wherein the at least one programmable device comprises at least one application processing unit (APU), at least real-time processing unit (RPU), and at least one programmable logic device.

Example 26 includes the method of any of Examples 17-25, wherein at least one of the radio frequency modules is configured to be assigned multiple carriers.

What is claimed is:

1. A multi-carrier radio point for a central radio access network (C-RAN) comprising a plurality of controllers and a plurality of radio points, the multi-carrier radio point comprising:
   at least one programmable device configured to provide processing resources for providing wireless service to a plurality of items of user equipment (UEs) using multiple bi-directional radio frequency carriers;
   at least one network interface configured to communicatively couple the multi-carrier radio point to a front-haul network in order to communicate with the plurality of controllers; and
   a plurality of radio frequency modules configured to wirelessly communicate using one or more antennas;
   wherein at least one programmable device is configured to:
      perform a discovery process in order for the multi-carrier radio point to be associated with one or more of the controllers;
      receive requests from one or more controllers for the processing resources and the radio frequency modules;
      assign the processing resources and the radio frequency modules to the one or more controllers based on the requests; and
      configure the processing resources and the radio frequency modules to instantiate one or more radio point instances, each radio point instance homed to a respective one of the controllers, each radio point instance implementing a respective carrier configuration; and
   wherein the multi-carrier radio point is configured to, in response to receiving requests from multiple controllers for the processing resources and the radio frequency modules, assign the processing resources and the radio frequency modules to the multiple controllers based on the requests.

2. The multi-carrier radio point of claim 1, wherein the respective processing resources and the respective radio frequency modules assigned to different controllers are configured in different ways.

3. The multi-carrier radio point of claim 1, wherein the radio point instances for different controllers are configured in different ways.

4. The multi-carrier radio point of claim 1, wherein the at least one programmable device is configured to assign the processing resources and the radio frequency modules to the one or more controllers based on the requests by doing the following:
   for each controller that is associated with the multi-carrier radio point:
      assign one or more carriers to that controller;
      assign one or more radio frequency modules to that controller, each radio frequency module associated with one or more carriers assigned to that controller;
      for each carrier assigned to that controller, instantiate a per-carrier manager instance configured to communicate data for that carrier with that controller over the front-haul network and instantiate a Layer-1 manager instance configured to manage Layer-1 processing performed for that carrier; and
      for each radio frequency module assigned to that controller, instantiate a radio controller instance configured to manage that radio frequency module.

5. The multi-carrier radio point of claim 4, wherein the at least one programmable device comprises an application programming unit configured to execute software; and
   wherein the software comprises a multi-carrier manager instance that is configured to assign, to each controller that is associated with the radio point, the respective one or more carriers and the respective one or more radio frequency modules and instantiate each per-carrier manager instance, Layer-1 manager instance, and radio controller instance for that controller.

6. The multi-carrier radio point of claim 1, wherein the at least one programmable device comprises an application programming unit configured to execute software; and
   wherein the software comprises a controller discovery instance that is configured to send discovery message over the front-haul network to the controllers.

7. The multi-carrier radio point of claim 1, wherein at least one programmable device is configured to support configuring at least one of the radio point instances to support at least one of the following:
   a first carrier configuration for a given radio point instance in which the associated controller is assigned a single carrier and a single RF module that is associated with the respective single carrier for said controller;
   a second carrier configuration for a given radio point instance in which the associated controller is assigned multiple carriers, wherein each of the multiple carriers is associated with a respective single radio frequency module;
   a third carrier configuration for a given radio point instance in which the associated controller is assigned one carrier that is used for multiple-input multiple-output (MIMO) communications, wherein multiple radio frequency modules are associated with the single carrier; and a fourth carrier configuration for a given radio point instance in which the associated controller is assigned multiple carriers, wherein one of the multiple carriers comprises a licensed RF carrier associated with a first single radio frequency module and the remaining carriers comprise unlicensed carriers associated with a second single radio frequency module.

8. The multi-carrier radio point of claim 7, wherein the second carrier configuration is used for communicating using Long-Term Evolution (LTE) Carrier Aggregation (CA).

9. The multi-carrier radio point of claim 7, wherein each RF module supports communicating using two antennas and the third carrier configuration is used with 4×4 MIMO communications.

10. The multi-carrier radio point of claim 7, wherein the fourth carrier configuration is used for communicating using Long-Term Evolution (LTE) Licensed Assisted Access (LAA).

11. The multi-carrier radio point of claim 1, wherein the at least one programmable device comprises at least one application processing unit (APU), at least real-time processing unit (RPU), and at least one programmable logic device.

12. The multi-carrier radio point of claim 1, wherein each of the radio frequency modules comprises respective circuitry that includes at least a digital-to-analog converter, power amplifier, low-noise amplifier, and analog-to-digital converter.

13. The multi-carrier radio point of claim 12, wherein the respective circuitry for each radio frequency module further comprises a respective upconverter and downconverter.

14. The multi-carrier radio point of claim 1, wherein at least one of the radio frequency modules is configured to be assigned multiple carriers.

15. The multi-carrier radio point of claim 1, wherein each bi-directional radio frequency channel is implemented using time division duplexing and/or frequency division duplexing.

16. The multi-carrier radio point of claim 1, wherein the at least one network interface comprises an Ethernet network interface to couple the multi-carrier radio point to a switch Ethernet network used to implement the front-haul network.

17. A method for a multi-carrier radio point used with a central radio access network (C-RAN) comprising a plurality of controllers and a plurality of radio points, the multi-carrier radio point comprising at least one programmable device configured to provide processing resources for providing wireless service to a plurality of items of user equipment (UEs) using multiple bi-directional radio frequency carriers and a plurality of radio frequency modules configured to wirelessly communicate using one or more antennas, the method comprising:
  performing a discovery process in order for the multi-carrier radio point to be associated with one or more of the controllers;
  receiving at the multi-carrier radio point requests from one or more controllers for the processing resources and the radio frequency modules;
  assigning the processing resources and the radio frequency modules to the one or more controllers based on the requests; and
  configuring the processing resources and the radio frequency modules to instantiate one or more radio point instances, each radio point instance homed to a respective one of the controllers, each radio point instance implementing a respective carrier configuration; and
  wherein, in response to receiving requests from multiple controllers for the processing resources and the radio frequency modules, assigning the processing resources and the radio frequency modules to the multiple controllers based on the requests.

18. The method of claim 17, wherein the respective processing resources and the respective radio frequency modules assigned to different controllers are configured in different ways.

19. The method of claim 17, wherein the radio point instances for different controllers are configured in different ways.

20. The method of claim 17, wherein assigning the processing resources and the radio frequency modules to the one or more controllers based on the requests comprises:
  for each controller that is associated with the multi-carrier radio point:
    assigning one or more carriers to that controller;
    assigning one or more radio frequency modules to that controller, each radio frequency module associated with one or more carriers assigned to that controller;
    for each carrier assigned to that controller, instantiating a per-carrier manager instance configured to communicate data for that carrier with that controller over a front-haul network and instantiate a Layer-1 manager instance configured to manage Layer-1 processing performed for that carrier; and
    for each radio frequency module assigned to that controller, instantiating a radio controller instance configured to manage that radio frequency module.

21. The method of claim 17, wherein the multi-carrier radio point is configured to support configuring at least one of the radio point instances to support at least one of the following:
  a first carrier configuration for a given radio point instance in which the associated controller is assigned a single carrier and a single radio frequency module that is associated with the respective single carrier for said controller;
  a second carrier configuration for a given radio point instance in which the associated controller is assigned multiple carriers, wherein each of the multiple carriers is associated with a respective single radio frequency module;
  a third carrier configuration for a given radio point instance in which the associated controller is assigned one carrier that is used for multiple-input multiple-output (MIMO) communications, wherein multiple radio frequency modules are associated with the single carrier; and
  a fourth carrier configuration for a given radio point instance in which the associated controller is assigned multiple carriers, wherein one of the multiple carriers comprises a licensed RF carrier associated with a first single radio frequency module and the remaining carriers comprise unlicensed carriers associated with a second single radio frequency module.

22. The method of claim 21, wherein the second carrier configuration is used for communicating using Long-Term Evolution (LTE) Carrier Aggregation (CA).

23. The method of claim 21, wherein each RF module supports communicating using two antennas and the third carrier configuration is used with 4×4 MIMO communications.

24. The method of claim 21, wherein the fourth carrier configuration is used for communicating using Long-Term Evolution (LTE) Licensed Assisted Access (LAA).

25. The method of claim 17, wherein the at least one programmable device comprises at least one application processing unit (APU), at least real-time processing unit (RPU), and at least one programmable logic device.

26. The method of claim 17, wherein at least one of the radio frequency modules is configured to be assigned multiple carriers.

* * * * *